United States Patent
Agarwal et al.

(10) Patent No.: US 11,455,202 B2
(45) Date of Patent: Sep. 27, 2022

(54) REAL-TIME FAULT LOCALIZATION DETECTION AND NOTIFICATION

(71) Applicant: International Business Machines Corporation, Armonk, NY (US)

(72) Inventors: Shivali Agarwal, Ghaziabad (IN); Rama Kalyani T. Akkiraju, Cupertino, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 4 days.

(21) Appl. No.: 17/011,514

(22) Filed: Sep. 3, 2020

(65) Prior Publication Data

US 2022/0066856 A1 Mar. 3, 2022

(51) Int. Cl.
| | | |
|---|---|---|
| G06F 11/30 | (2006.01) | |
| G06F 11/07 | (2006.01) | |
| H04L 51/04 | (2022.01) | |
| H04L 51/216 | (2022.01) | |

(52) U.S. Cl.
CPC ...... *G06F 11/0769* (2013.01); *G06F 11/0709* (2013.01); *G06F 11/0751* (2013.01); *G06F 11/0793* (2013.01); *G06F 11/302* (2013.01); *H04L 51/04* (2013.01); *H04L 51/216* (2022.05)

(58) Field of Classification Search
CPC .. G06F 11/079; G06F 11/302; G06F 11/0793; G06F 11/0709; G06F 11/0769; G06F 11/0751; G06F 11/0775; G06F 11/0784; H04L 51/04; H04L 51/16
See application file for complete search history.

(56) References Cited

U.S. PATENT DOCUMENTS

| | | | | |
|---|---|---|---|---|
| 2007/0140133 | A1* | 6/2007 | Gudipalley | H04L 41/065 370/242 |
| 2008/0183850 | A1* | 7/2008 | Basu | H04L 67/16 709/223 |
| 2012/0159268 | A1* | 6/2012 | LeCroy | H04L 51/04 714/57 |

(Continued)

OTHER PUBLICATIONS

Disclosed Anonymously, "Cognitive system to provide data source for problem solving", An IP.com Prior Art Database Technical Disclosure, IP.com No. IPCOM000252326D, Jan. 4, 2018, 5 pages, ip.com.

(Continued)

*Primary Examiner* — Yolanda L Wilson
(74) *Attorney, Agent, or Firm* — Ference & Associates LLC (57) ABSTRACT

One embodiment provides a method, including: monitoring a first chat channel within a distributed collaboration environment; identifying an outage affecting a service associated with the first chat channel; providing, to at least a second chat channel associated with at least a second service, a notification of the outage affecting the service, wherein the at least a second service is identified as having a dependency on the service; determining, at the at least a second chat channel, the outage is causing an incident with the at least a second service, wherein the determining comprises monitoring the at least a second chat channel for messages related to the incident; and interjecting, within the at least a second chat channel, a message regarding the outage affecting the service.

18 Claims, 4 Drawing Sheets

(56) References Cited

U.S. PATENT DOCUMENTS

| | | | |
|---|---|---|---|
| 2014/0129536 A1 | 5/2014 | Anand et al. | |
| 2014/0281739 A1* | 9/2014 | Tuffs | G06F 11/0709 714/47.2 |
| 2015/0089042 A1* | 3/2015 | Repperger | G06F 11/0709 709/224 |
| 2016/0135065 A1* | 5/2016 | Yu | H04L 41/0654 370/216 |
| 2020/0252264 A1* | 8/2020 | Arora | H04L 41/069 |
| 2020/0409825 A1* | 12/2020 | Balasubramanian | G06F 16/90335 |
| 2021/0081265 A1* | 3/2021 | Mariyappa | G06F 11/079 |
| 2021/0133014 A1* | 5/2021 | Agarwal | G06F 11/0709 |

OTHER PUBLICATIONS

Hamid R. Motahari-Nezhad et al., "IT Support Conversation Manager: A Conversation-Centered Approach and Tool for Managing Best Practice IT Processes", 14th IEEE International Enterprise Distributed Object Computing Conference, 2010, 10 pages, IEEE Computer Society.

Jian-Guang Lou et al., "Experience report on applying software analytics in incident management of online service", Autom Softw Eng, DOI 10.1007/s10515-017-0218-1, Jul. 1, 2017, 37 pages, Springer.

Serhat Can, "Best practices for using Chatbots to solve incidents faster", Chatbotsmagazine.com, May 21, 2018, 6 pages, Copy available at: https://chatbotsmagazine.com/best-practices-for-using-chatbots-to-solve-incidents-faster-71138b4c8bf.

Disclosed Anonymously, "A Method for Analyzing Problems in Composite Software Applications", An IP.com Prior Art Database Technical Disclosure, IP.com No. IPCOM000209395D, Aug. 3, 2011, 11 pages, ip.com.

\* cited by examiner

REAL-TIME FAULT LOCALIZATION DETECTION AND NOTIFICATION

BACKGROUND

Many different domains work within a distributed collaborative environment, for example, a cloud environment, distributed network environment, or the like. The distributed collaborative environment allows people and different services to physically work in different geographical locations while still allowing the people within the service to interact and work together. Many of these distributed collaborative environments provide chat channels that allow people to communicate among themselves. Generally, the environment has many different chat channels, with each channel being associated with a particular service or sub-service. For example, if the overall domain is an information technology operations management domain, each service or subservice within this domain may have its own chat channel. There may also be multiple chat channels that are associated with a single service. For example, one service may have a performance chat channel, a ticket chat channel, and a general chat channel. The chat channels may be designated based upon overall service, component, action, roles, incidents, or however is best suited for the particular service or overall domain. The users utilize the chat channels to work collaboratively on projects, tickets, and the like, and also to share information among all the users.

BRIEF SUMMARY

In summary, one aspect of the invention provides a method, comprising: monitoring a first chat channel within a distributed collaboration environment; identifying, within real-time chat logs of the first chat channel, an outage affecting a service associated with the first chat channel; providing, to at least a second chat channel associated with at least a second service, a notification of the outage affecting the service, wherein the at least a second service is identified as having a dependency on the service associated with the first chat channel; determining, at the at least a second chat channel, the outage is causing an incident with the at least a second service, wherein the determining comprises monitoring the at least a second chat channel for messages related to the incident; and interjecting, within the at least a second chat channel, a message regarding the outage affecting the service, responsive to determining the outage is causing the incident.

Another aspect of the invention provides an apparatus, comprising: at least one processor; and a computer readable storage medium having computer readable program code embodied therewith and executable by the at least one processor, the computer readable program code comprising: computer readable program code configured to monitor a first chat channel within a distributed collaboration environment; computer readable program code configured to identify, within real-time chat logs of the first chat channel, an outage affecting a service associated with the first chat channel; computer readable program code configured to provide, to at least a second chat channel associated with at least a second service, a notification of the outage affecting the service, wherein the at least a second service is identified as having a dependency on the service associated with the first chat channel; computer readable program code configured to determine, at the at least a second chat channel, the outage is causing an incident with the at least a second service, wherein the determining comprises monitoring the at least a second chat channel for messages related to the incident; and computer readable program code configured to interject, within the at least a second chat channel, a message regarding the outage affecting the service, responsive to determining the outage is causing the incident.

An additional aspect of the invention provides a computer program product, comprising: a computer readable storage medium having computer readable program code embodied therewith, the computer readable program code executable by a processor and comprising: computer readable program code configured to monitor a first chat channel within a distributed collaboration environment; computer readable program code configured to identify, within real-time chat logs of the first chat channel, an outage affecting a service associated with the first chat channel; computer readable program code configured to provide, to at least a second chat channel associated with at least a second service, a notification of the outage affecting the service, wherein the at least a second service is identified as having a dependency on the service associated with the first chat channel; computer readable program code configured to determine, at the at least a second chat channel, the outage is causing an incident with the at least a second service, wherein the determining comprises monitoring the at least a second chat channel for messages related to the incident; and computer readable program code configured to interject, within the at least a second chat channel, a message regarding the outage affecting the service, responsive to determining the outage is causing the incident.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-4. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 4. In accordance with an example embodiment, most if not all of the process steps, components and outputs discussed with respect to FIGS. 1-3 can be performed or utilized by way of a processing unit or units and system memory such as those indicated, respectively, at 16' and 28' in FIG. 4, whether on a server computer, a client computer, a node computer in a distributed network, or any combination thereof.

Many domains are very complex and include many different services, components, hardware, software, applications, and other elements, with many of these elements working together with other elements of the domain. Additionally, some of the elements are only functional if other elements are also functioning, meaning some elements are dependent on other elements. In the case of dependencies, if an outage occurs at one element, it can affect those elements which are dependent upon the element experiencing an outage. However, due to the complexity of the domains, it can be difficult to know which elements are dependent on other elements and which elements may be affected by outages or faults on an element. Thus, when an incident, fault, or outage occurs at one element, it can be difficult to know the root cause of the incident. For example, the incident may be caused by something occurring within the element or it may be caused by an outage or fault within another element. Quickly isolating, identifying, and resolving an incident is critical to ensuring that all the elements of the domain are functioning properly.

One conventional technique for performing fault localization, which is the process of identifying a root cause of a fault, is utilizing logs, metrics, topology, and/or alert data as inputs. This requires a person or team of people to receive notification of a fault and then manually access the logs, metrics, topology, and/or alert data to identify a possible fault cause. For example, the person may access service logs and find exceptions noted in the service log. An exception identifies that a process occurred in a manner that was unexpected or not correctly. The person must then comb the logs to identify what caused the exception. Once the cause of the exception is identified, the person must correlate the cause of the exception to a component, service, software, application, or the like, that could have resulted in the exception. This is a very time-consuming process. Additionally, use of logs, metrics, topology, and/or alert data may result in incorrect conclusions. For example, while a cause may be identified, it may not be the root cause. Thus, fixing the cause may not result in a permanent fix of the problem because the root cause has not yet been identified and resolved. This results in additional downtime when a problem occurs again.

Another conventional approach relies on incident similarity analysis. When an incident occurs, the symptoms of the incident as identified from logs, metrics, and alerts, are compared with symptoms of historical incidents. When a historical incident is identified that has symptoms similar to the current incident, a person identifies what was the cause of the historical incident and what was done to address the historical incident. However, while more sophisticated than guessing regarding incident causes, such a technique is similar to guessing in that it frequently results in inaccurate cause identifications. Thus, while the person spends time trying to fix an element that may not even be broken, the element experiencing the fault remains inoperative. Accordingly, this conventional technique is also ineffective and inefficient in fault localization.

Accordingly, an embodiment provides a system and method for performing fault localization in a distributed collaborative environment by monitoring a chat channel for outage information that may affect a dependent service and then providing a notification to a dependent service chat channel. The system monitors chat channels within a distributed collaboration environment. Each of the channels has a corresponding interpretation module and decision module. For ease of readability, the discussion herein will refer to a first chat channel that is monitored. However, the system monitors all the chat channels within the distributed collaboration environment using an interpretation module unique to each of the chat channels. Thus, the first chat channel can be any of or multiple of the chat channels within the environment. While monitoring the first chat channel, the system may identify an outage affecting a service that is associated with the first chat channel, referred to as a first service for ease of readability. Each of the chat channels is associated with a service of the domain, as discussed earlier.

Upon identifying the outage affecting the first service, the interpretation module corresponding to the first channel provides a notification to a second chat channel. As with the first chat channel, a second chat channel will be referred to for ease of readability. However, it should be understood that the notification may be provided to multiple chat channels and not just a single chat channel. The system provides the notification to the chat channel associated with a service that is dependent on the first service, referred to as a second service for ease of readability. There may be multiple services that are dependent upon the first service. Therefore, there may be multiple second services. However, a single second service will be discussed here throughout for ease of readability. This is not intended to limit the scope of this disclosure. To identify that one service is dependent upon another service, the system may employ a communication and outage pattern extractor module and a dependency knowledge builder module. These modules, unlike the interpretation module and decision module which are unique to each chat channel, are shared among all the chat channels.

Using a decision module corresponding to the second chat channel, the system determines if the outage of the first service is causing a fault, outage, or other type of incident, collectively referred to as incident, with the second service. To make this determination, the system, using the interpretation module of the second chat channel, monitors the chat communications occurring on the second chat channel for messages related to the incident. Upon detecting that the outage is causing an incident with the second service, the system proactively interjects a message into the second chat channel regarding the outage of the first service. The message may also provide details regarding the outage and a likelihood regarding whether the outage of the first service is the cause of the incident of the second service. Additionally, the system may continue to monitor the chat channels to determine if the outage has been resolved and provide this resolution identification to the second chat channel.

Such a system provides a technical improvement over current systems for fault localization in a distributed collaborative environment. Instead of relying on manual identification through logs, metrics, topology, and/or alert data, or incident similarity matching, the described system is able to use real-time communications on chat channels within the distributed system to perform fault localization. Such a system results in a fault localization process that is more efficient and more accurate than conventional techniques. Additionally, while people may manually monitor other chat channels, the distributed system is so complex that it is not possible to monitor every possible channel. Accordingly, the person who is performing the monitoring would have to identify those channels which are most relevant to the target channel. However, without the use of the described system and method and the use of the computer processing capabilities, the person has no way of understanding the true dependencies between services and, therefore, which channels are actually relevant to a target channel. Thus, the described system and method provides a technical improvement to the fault localization domain that is not possible using conventional techniques or without the use of computer processing capabilities and techniques that are unique to computers and processors and not possible to be performed by hand by humans.

Figure 1:
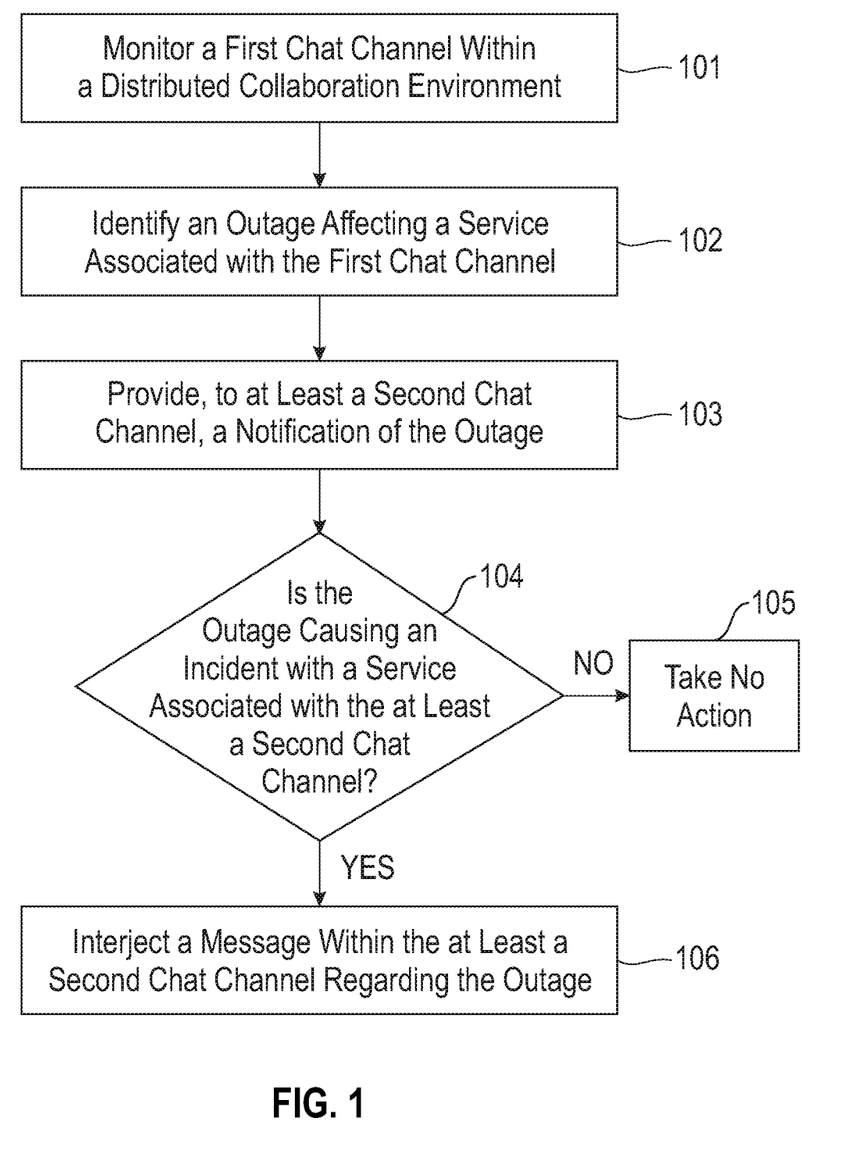
FIG. 1 illustrates a method of performing fault localization in a distributed collaborative environment by monitoring a chat channel for outage information that may affect a dependent service and then providing a notification to a dependent service chat channel.

FIG. 1 illustrates a method for performing fault localization in a distributed collaborative environment by monitoring a chat channel for outage information that may affect a dependent service and then providing a notification to a dependent service chat channel. An outage of a service refers to any fault, outage, or other incident that occurs at a service and causes the service to no longer function properly. Thus, an outage may be a small fault that only affects a part of the service or may be a large incident that affects the entire service such that the service is no longer functioning. At 101, the system monitors a first chat or communication channel within the distributed collaboration environment. The distributed collaboration environment includes a plurality of chat channels. Thus, as stated before, while the system monitors all chat or communication channels, a first chat channel will be referred to herein for ease of readability. Each of the chat channels may be directed to communications involving particular services, roles, incidents, general, or the like. Additionally, even though communications within a particular chat channel are directed to a particular topic, each of the chat channels is associated with a particular service. Thus, each service within the domain may have multiple associated chat channels.

Each of the chat channels has a corresponding unique and dedicated interpretation module and decision module. The interpretation module monitors messages on a specific chat channel and interprets the communications that are occurring on the channel. The interpretation module is trained to identify communications that are directed to an outage corresponding to a service associated with the chat channel the interpretation module is monitoring. To train the interpretation module, the system collects data points from the historical communications that have occurred on the chat channel. Additionally, the system collects data points from communications as they are occurring on the chat channel (i.e., in real-time) to further tune and train the interpretation module.

The interpretation module is being trained to recognize the different ways that users on a chat channel discuss outages and services affected by outages. Thus, the data points that are collected may be any conversations or messages on the chat channel that could be associated with an outage, a service, another service, impacts of outages, and the like. For example, the system may extract conversations from the chat channel that mention other chat channels, other services, or other outages. As another example, the system may extract conversations that contain pages or calls to other channels along with an incident or outage description. As another example, the system may extract conversations that include information about certain outages, for example, an identifier of the outage, a time of occurrence of a past outage, a service affected by a past outage, or the like. The system may also extract other information, for example, descriptions or statements of impacts of outages, outage resolution information, and/or the like. The system may make a summary of the outage, resolution, and sequence of events to be stored in the memory of the chat channel.

Using the collected data points, the interpretation module learns information related to how outages and resolutions are identified and discussed within the chat channel. For example, the interpretation module can learn possible manners in which outages are reported on or for the chat channel. As another example, the interpretation module learns how information is implicitly or explicitly solicited regarding outages, planned outages, resolutions of outages, and the like. Additionally, the interpretation module learns contexts regarding when or how information from other channels is solicited based upon incidents within the chat channel. The interpretation module may also learn different information regarding outages, for example, regions affected, customers and environments impacted, length of times of the outage, and the like. The training of and learning by the interpretation module is attempting to determine how people express outage or resolution information within conversations on the chat channel so the interpretation module can identify real-time outages or resolutions.

The interpretation module is trained using information that is unique to the chat channel that the interpretation module is programmed for. In other words, since the interpretation module is dedicated and unique to a specific chat channel, the interpretation module does not need to learn how information regarding outages and resolutions are discussed on other chat channels and can, instead, be hyper-focused on the chat channel corresponding to the interpretation module. Thus, the monitoring at 101 is performed using the trained interpretation module corresponding to, assigned to, or belonging to a specific chat channel, such as the first chat channel. Even though the interpretation module is trained using historical communication information, the interpretation module is continually retrained using real-time communications. In other words, the interpretation module is a machine-learning model that is continually trained using communication information of the first chat channel.

The trained interpretation module can then be used to identify, within the real-time chat logs of the first chat channel, an outage affecting the first service associated with the first chat channel at 102. To identify the outage, the interpretation module listens to the messages on the first chat channel and interprets the chat using the learned information. Whenever the interpretation module identifies communications related to an outage of the first service, the interpretation module interprets the outage context, impact, and details. For example, the interpretation module may identify how much of the service is impacted by the outage, how long a service will be impacted by the outage, a source or cause of the outage, when the outage started, and any other details related to the outage.

When an outage is identified by the interpretation module, the interpretation module provides a notification to a second chat channel at 103. As stated before, a single second chat channel will be referred to herein for ease of readability, but there may be multiple second chat channels. The notification includes information related to the outage affecting the first service. The notification may simply indicate that an outage affecting the first service has occurred, or it may include additional information regarding the outage and details of the outage. For example, the notification may include all the information regarding the outage that the interpretation module of the first chat channel was able to identify. As another example, the notification may include a link or pointer to the conversation on the first chat channel that includes the information related to the outage. The notification is provided to the interpretation module of the second chat channel. Thus, not only does a chat channel interpretation module monitor the chat channel and identify information related to an outage, including resolution information, but it also formulates messages to be sent to second chat channels, makes a record of planned outage messages from a first chat channel, and makes a record of outage sequences, solicited information, and the like, for further training.

The first chat channel interpretation module does not provide a notification to every possible chat channel at 103. Instead, the first chat channel interpretation module is selective about which second chat channels receive the notification. Specifically, the first chat channel interpretation module provides notifications to chat channels that are associated with second services that are dependent on the first service. In other words, the first chat channel interpretation module provides notifications to chat channels that are associated with services that are downstream with respect to the first service. Accordingly, the system must determine what services within the domain are dependent on other services. By determining all dependent services within the domain, the system also identifies services that are upstream from a target service. In other words, once all service dependencies are mapped or identified within the domain, then the system could select any of the services and identify not only those services that are dependent upon that selected service, but can also identify the services that the selected service is dependent upon.

Figure 2:
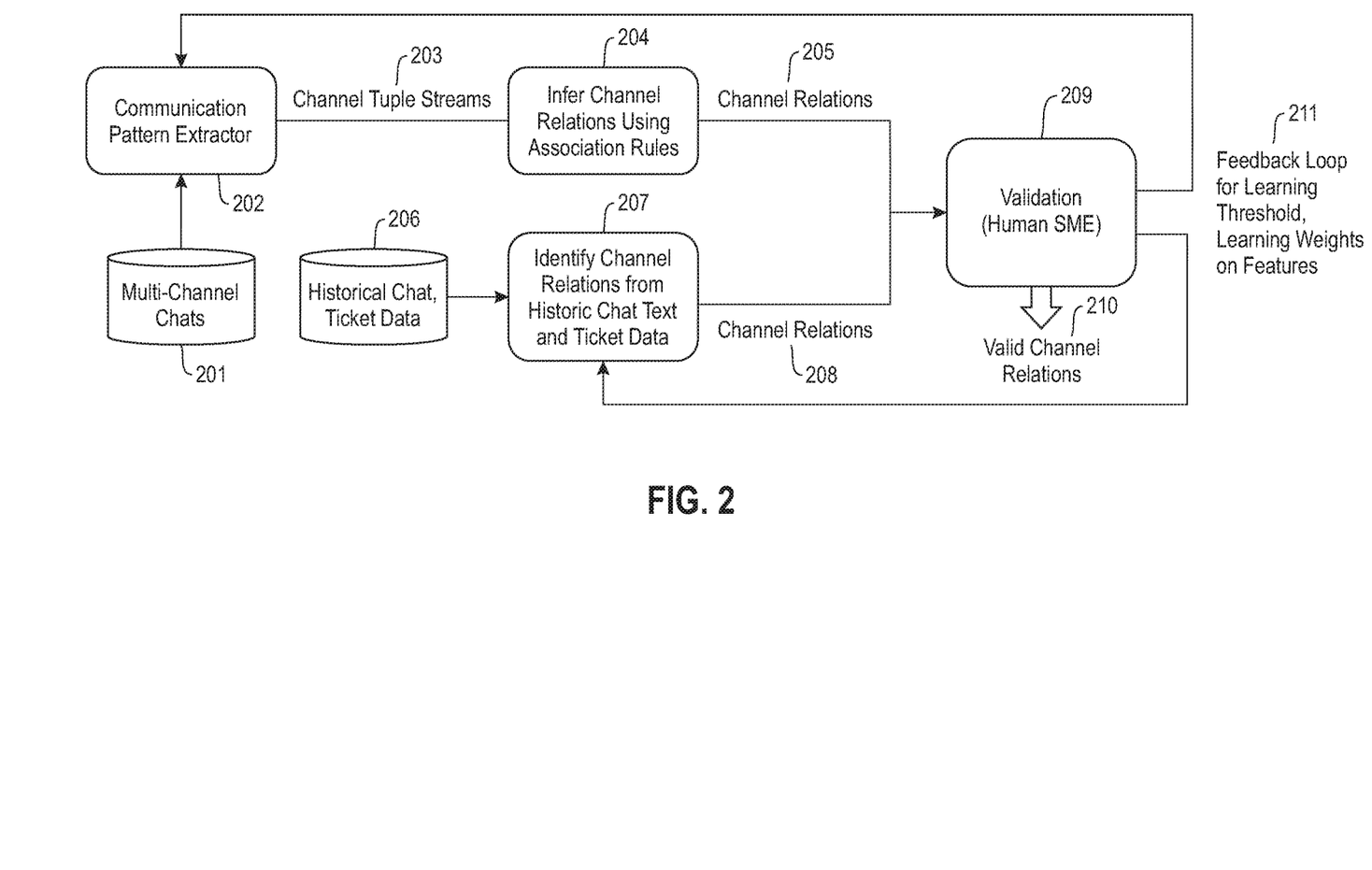
FIG. 2 illustrates method for a dependency knowledge builder.

Thus, the system has to identify the dependencies between services. To identify these dependencies, the system utilizes components that are shared by all the channels, a communication and outage pattern extractor and a dependency knowledge builder that utilizes the extracted patterns. FIG. 2 illustrates an overall method for identifying the service dependencies. The communication pattern extractor 202 takes as input the multi-channel chats 201. In other words, the system listens to each chat channel. Since this component is shared among all the channels, this component listens to all of the chat channels across the domain and not just a single channel. In order to prevent unnecessary processing, the system may first filter the historical communications. The filtering may include filtering the communications so that only communications relating to a particular outage/restoration type are further analyzed.

For each channel, the pattern extractor 202 creates tuples form the information within the chat channel. This tuple creation may be performed only on the filtered information or may be performed on all the information, depending on how the system is set up. The tuples may be in a form that identifies an outage, a channel of the outage, and other information related to the outage, for example, the region of the outage, environment of the outage, timestamp of the information, application name, service name, component name, and the like. While the discussion has been directed toward outages thus far, all of the described information may also apply to resolution of outages. Thus, other tuples may be created that are related to resolution of an outage. The output from the communication pattern extractor 202 are channel tuple streams 203.

The channel tuple streams 203 are passed to a component that infers channel relations using association rules 204. The association rules can be provided by a user or learned by the system over time as dependencies are identified and verified, or a combination thereof. The association rules create dependency relations between channels. The dependency relations indicate that a second service is dependent on a first service and an outage in the first service would affect the second service. To find the associations the system applies rules to the tuple streams of each channel. Some of the rules may be based upon the timestamps of the information. For example, if an outage in the second service occurs before an outage or incident in the first service, then there is a possibility that the first service is dependent on the second service. Similarly, timestamps related to resolutions, service restorations, and the like, can also indicate dependencies. Some rules may also be based upon the other information from the tuple streams. For example, one rule may be based upon a region of the outage. For example, if a region affected by the first service outage is equivalent to the region affected by the second service incident, then there may be a dependency between the services. As another example, if one environment affects another environment, then there may be a dependency between services within those environments.

The results of the application of the rules may be positive or negative with respect to dependency. For example, application of a rule may indicate that there is no dependency, there is possibly a dependency, there is likely a dependency, or there is definitely a dependency. As an example, one association rule may state that an incident occurring before an outage indicates no dependency (a negative value). As another example, an association rule may state that a resolution of an outage occurring before a resolution of an incident indicates there may be a dependency (a non-negative value). Other association rules may be based upon regions, environments, other timestamps, and other factors. Once the rules have been applied, the system may determine how many rules result in non-negative values with respect to dependency. In other words, the system determines how many rules result in values that indicate a possible, likely, or definite dependency. Thus, a non-negative value is a value other than a value indicating that there is no dependency. If the number of rules that result in non-negative values meets or exceeds a predefined threshold number of rules, then the services may be identified as having a dependency or possible dependency. Thus, the output of component 204 may be channel relations 205.

In parallel, or additionally, the system may perform a separate analysis utilizing historical chat text and/or ticket data 206. As with the pattern extractor 202, the system may filter the historical chat text and/or ticket data so that only historical chat text and/or ticket data relating to a particular outage/restoration type is analyzed. This may be provided as input to a component that identifies channel relations from the historical chat text and ticket data 207. In this analysis, the system analyzes, for example, using a text analysis technique (e.g., information extractor, semantic analysis, syntactic analysis, etc.), the information contained within the historical chat communications for any communications that may indicate a dependency either explicitly or implicitly. For example, a user may provide a message within a communication that indicates an outage at a particular service is affecting the service associated with the target chat channel. As another example, a user may provide notification of a planned outage of another channel service that will affect the target channel service.

The previous examples illustrate more explicit dependency identifications. As an example of an implicit dependency identification, a user may page or call another channel requesting information regarding whether the service of the other channel is experiencing an outage. Thus, the system can analyze the text within the historical chat to determine if there is any mention, either explicit or implicit, of other services or channels that have a dependency on the current channel, either a downstream or an upstream dependency.

The system can also perform an analysis on ticket data. The ticket data analysis for determining dependencies may be performed utilizing ticketing tools. The ticketing tools capture related incidents or upstream incidents. The tools can then be used to mine the causal relationships between incidents. Incidents having a causal relationship can indicate that services corresponding to the incidents may have a dependency. Thus, the system generates a dependency graph for services based upon the causal relationships between incidents. Thus, like the output from component 204, the output from component 207 is channel relations 208.

The channel relations 205 and channel relations 208 are sent to a human for validation 209. Not all channel relations 205 and 208 need to be sent for validation 209. For example, where there are explicit identifications of dependencies, these identifications do not need to be validated by a human because they have essentially already been validated. The output from the validation is the valid channel relations 210. These valid channel relations 210 may also include the channel relations that did not need to be validated. The feedback from the human 209 may be used as feedback 211 to the pattern extractor 202/association rule component 204, through the pattern extractor 202, and historical chat text and ticket data component 207 to make these components more accurate in order to result in more accurate channel relations at 205 and 208. For example, if a channel relation is marked as true, the inferences on the outage detection, timestamp relations, service restorations, and the like, made by components 202/204 and 207 are reinforced. As another example, if a channel relation is marked as false, the feedback will be further analyzed to determine if the outage report was incorrect, a service restoration was identified incorrectly, or if the inferences made by components 202/204 and 207 are incorrect.

The notification provided at 103 may be provided to an interpretation module of the second chat channel. The interpretation module may then pass the notification to a decision module that is dedicated to and unique to the second chat channel. The decision module may then determine, at 104, if the outage affecting the first service is causing an incident with the second service which is associated with the second chat channel. It should be noted that, in this application, the terms outage and incident are defined similarly. However, for the sake of clarity, the term "outage" is used to refer to the fault affecting the first service, and the term "incident" is used to refer to the fault affecting the second service.

To make the determination at 104, the decision module monitors the second chat channel for messages related to an incident (e.g., outage, fault, error, etc.). If an incident is occurring with the service associated with the second chat channel, the decision module may process the messages received from the first service which has been identified as an upstream service. Thus, the decision module processes the ongoing incident in context with the upstream outage messages and planned outage message records to arrive at a possible fault location/cause.

If the system determines that the outage is not causing an incident with the second service at 104, then the decision module may take no action with respect to the notification at 105. The notification may also be stored in a memory of the second chat channel for future incidents, training, or tuning. If, on the other hand, the system determines that the outage at the first service is causing the incident at the second service at 104, then the decision module may decide to interject a message regarding the outage into the second chat channel at 106. In other words, the system may proactively, and without human intervention, post a message within the second chat channel providing information regarding the first service outage. Thus, the message may include an indication of the first service outage as a possible cause of the second service incident. The outage message may be a simple message identifying the outage, or may include details regarding the outage, for example, the service affected by the outage, the time of the outage, the type of outage, expected outage duration, and the like. Additionally, a user may be able to request additional information in response to the interjected outage message. The system may then respond with additional details, a link to the chat channel having the additional details, or the like.

If the decision module determined that a message related to the outage affecting the first service should be interjected into the second chat channel, the decision module also monitors the upstream resolution messages in order to interject messages into the second chat channel regarding the resolution. The monitoring of resolution messages may occur in a similar fashion to the monitoring, filtering, and identification of the outage messages as described in connection with steps 101 and 102. The interjected resolution messages may indicate to a user that the incident should be resolved. If the incident is not resolved, then the system can use this information to further tune the decision module regarding any subsequent incidents. The interjected resolution message, like the interjected outage message, may be a very simple message or may include details regarding the resolution, what the resolution was, when the resolution occurred, and the like. Also, like with the outage message, a user may be able to request additional information in response to the interjected resolution message. The system may then respond with additional details, a link to the chat channel having the additional details, or the like.

Figure 3:
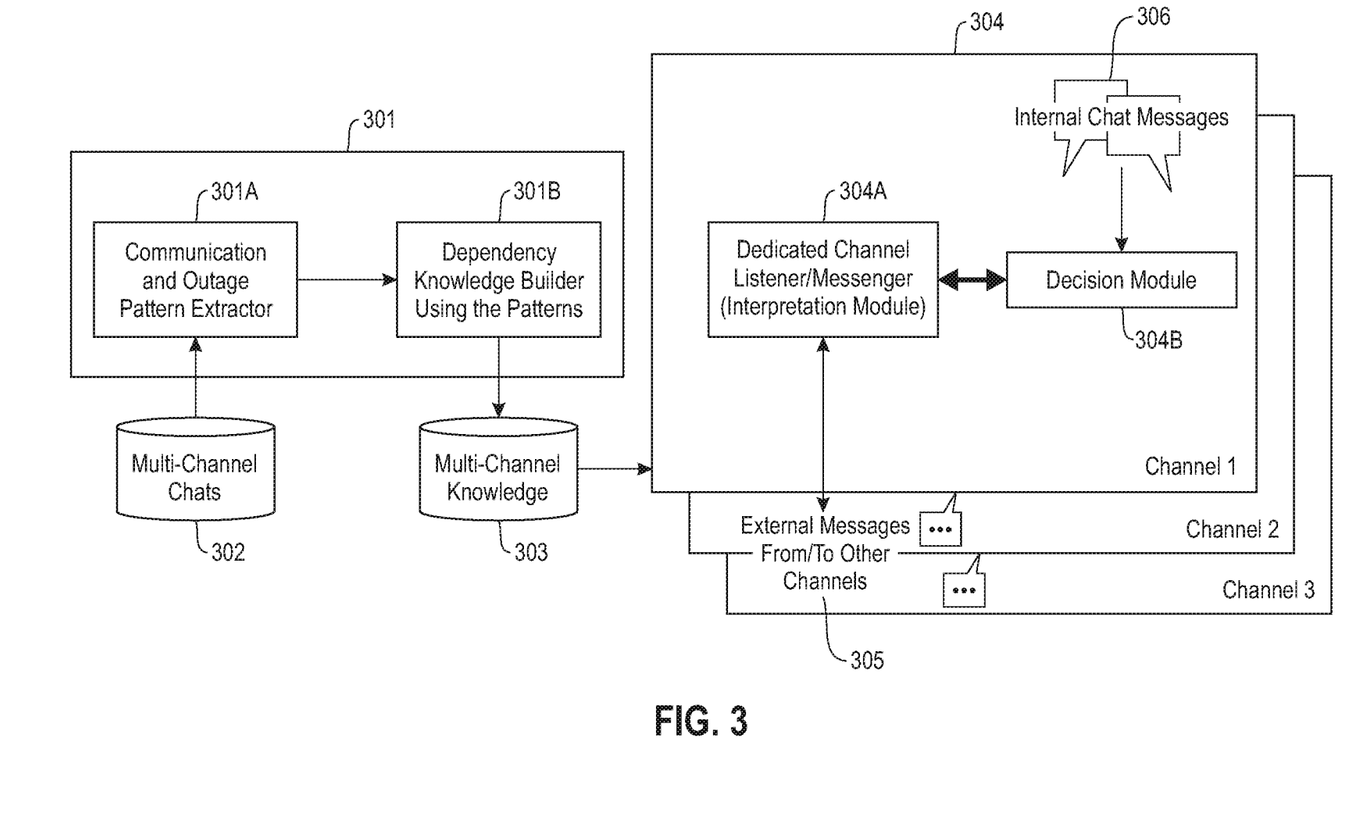
FIG. 3 illustrates an example system architecture for performing fault localization in a distributed collaborative environment by monitoring a chat channel for outage information that may affect a dependent service and then providing a notification to a dependent service chat channel.

FIG. 3 illustrates an overall system architecture of the described system and method. The system includes components that are shared between all channels in the distributed collaboration environment 301. These components include a communication and outage pattern extractor 301A that takes the multi-channel chats 302 as input. The pattern extractor identifies and extracts patterns from the multi-channel chats 302. The output from the communication and outage pattern extractor 301A is provided to a dependency knowledge builder 301B that learns service dependencies form the patterns identified using the communication and outage pattern extractor 301A. The dependency knowledge builder 301B then gains a dependency knowledge across all the channels within the distributed collaboration environment 303.

The system also includes components that are unique to and dedicated to specific channels 304. These components may include a dedicated channel listener/messenger, also referred to as an interpretation module, 304A and a decision module 304B. The interpretation module 304A for a particular channel provides information regarding outages/resolutions affecting the service of the channel to dependent service chat channels 305. The interpretation module 304A also receives messages from interpretation modules of upstream dependent channels 305. Both the downstream and upstream channel dependencies are identified from the multi-channel knowledge 303. The interpretation module 304A passes the information to the decision module 304B. The decision module 304B makes a determination regarding whether the information received from the interpretation module 304A is relevant to a current conversation within the chat channel by monitoring the internal chat messages or message occurring on the chat channel 306. If the decision module 304B determines the information does have relevance, it proactively, and without human intervention, interjects a message onto the chat channel regarding the outage.

Thus, the described systems and methods represent a technical improvement over current systems for fault localization. The described system and method is able to monitor chat channels in a manner that is not possible using conventional techniques. Additionally, the system is able to identify dependencies between services associated with channels in order to accurately propagate information regarding a fault or outage at one service to those channels associated with services that may be affected by the fault or outage at the one service. Thus, the described system and method is more efficient and accurate at performing fault localization than conventional techniques that rely on users to perform manual analyses of logs, metrics, topologies, and/or alert data or incident similarity analysis.

Figure 4:
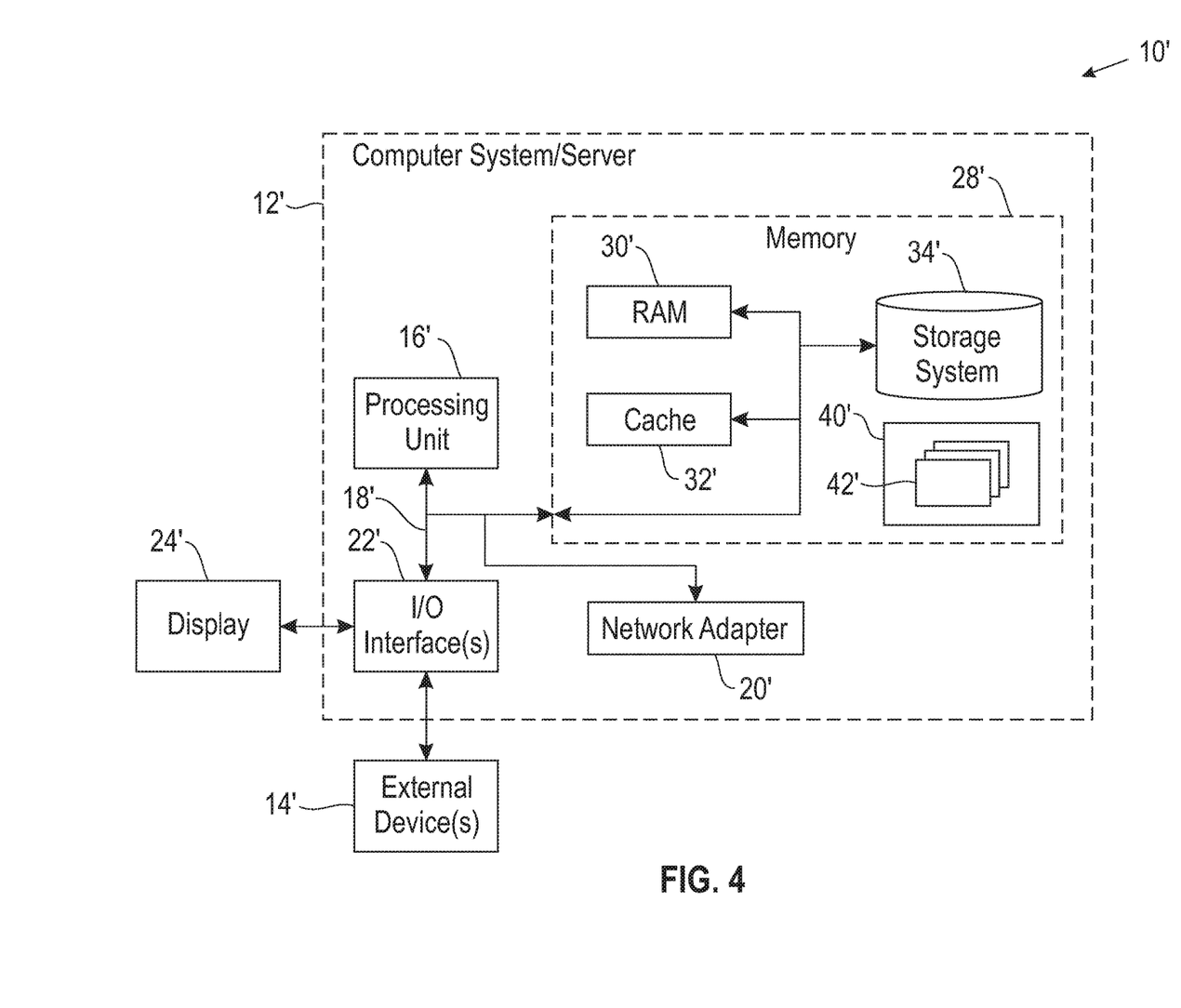
FIG. 4 illustrates a computer system.

As shown in FIG. 4, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/ server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method, comprising:
    monitoring, utilizing an interpretation module, wherein the interpretation module is a machine-learning model, unique and dedicated to a first chat channel within a distributed collaboration environment, the first chat channel, wherein the interpretation module monitors and interprets messages on the first chat channel, wherein the interpretation module is trained, utilizing data points of historical communications of the first chat channel, to identify communications directed to an outage on the first chat channel;
    identifying, within real-time chat logs of the first chat channel and utilizing the interpretation module, an outage affecting a service associated with the first chat channel, wherein the identifying comprises the interpretation module identifying communications, from the real-time chat logs, directed to an outage based upon the training;
    providing, to at least a second chat channel associated with at least a second service, a notification of the outage affecting the service, wherein the at least a second service is identified as having a dependency on the service associated with the first chat channel;
    determining, at the at least a second chat channel, the outage is causing an incident with the at least a second service, wherein the determining comprises monitoring the at least a second chat channel for messages related to the incident; and
    interjecting, within the at least a second chat channel, a message regarding the outage affecting the service, responsive to determining the outage is causing the incident.

2. The method of claim 1, wherein the dependency is identified, using a dependency knowledge builder, from historical chat communications across chat channels of the distributed collaboration environment, each of the chat channels being associated with a service.

3. The method of claim 2, wherein the historical chat communications are filtered to identify the historical chat communications from a plurality of chat channels that are applicable to a specific outage type and wherein the dependency is identified based upon identifying services associated with each of the plurality of chat channels corresponding to the filtered historical chat communications.

4. The method of claim 1, wherein the dependency is identified by applying dependency rules to communications on the plurality of chat channels and determining a chat channel is dependent on another chat channel when results of the dependency rules exceed a predetermined threshold number.

5. The method of claim 4, further comprising feedback from a user regarding an accuracy of the identified dependency and utilizing the feedback to further tune the identification of dependencies.

6. The method of claim 1, wherein the message comprises an indication of the outage as a possible cause of the incident.

7. The method of claim 1, further comprising monitoring, from the at least a second chat channel, the first chat channel for communications related to resolution of the outage.

8. The method of claim 7, further comprising interjecting, within the at least a second chat channel, a message regarding the resolution of the outage.

9. The method of claim 1, wherein the at least a second chat channel comprises a plurality of chat channels all associated with services identified as having a dependency on the service associated with the first chat channel.

10. An apparatus, comprising:
    at least one processor; and
    a computer readable storage medium having computer readable program code embodied therewith and executable by the at least one processor, the computer readable program code comprising:
    computer readable program code configured to monitor, utilizing an interpretation module, wherein the interpretation module is a machine-learning model, unique and dedicated to a first chat channel within a distributed collaboration environment, the first chat channel, wherein the interpretation module monitors and interprets messages on the first chat channel, wherein the interpretation module is trained, utilizing data points of historical communications of the first chat channel, to identify communications directed to an outage on the first chat channel;
    computer readable program code configured to identify, within real-time chat logs of the first chat channel and utilizing the interpretation module, an outage affecting a service associated with the first chat channel, wherein the identifying comprises the interpretation module identifying communications, from the real-time chat logs, directed to an outage based upon the training;
    computer readable program code configured to provide, to at least a second chat channel associated with at least a second service, a notification of the outage affecting the service, wherein the at least a second service is identified as having a dependency on the service associated with the first chat channel;
    computer readable program code configured to determine, at the at least a second chat channel, the outage is causing an incident with the at least a second service, wherein the determining comprises monitoring the at least a second chat channel for messages related to the incident; and
    computer readable program code configured to interject, within the at least a second chat channel, a message regarding the outage affecting the service, responsive to determining the outage is causing the incident.

11. A computer program product, comprising:
    a computer readable storage medium having computer readable program code embodied therewith, the computer readable program code executable by a processor and comprising:
    computer readable program code configured to monitor, utilizing an interpretation module, wherein the interpretation module is a machine-learning model, unique and dedicated to a first chat channel within a distributed collaboration environment, the first chat channel, wherein the interpretation module monitors and interprets messages on the first chat channel, wherein the interpretation module is trained, utilizing data points of historical communications of the first chat channel, to identify communications directed to an outage on the first chat channel;

computer readable program code configured to identify, within real-time chat logs of the first chat channel and utilizing the interpretation module, an outage affecting a service associated with the first chat channel, wherein the identifying comprises the interpretation module identifying communications, from the real-time chat logs, directed to an outage based upon the training;

computer readable program code configured to provide, to at least a second chat channel associated with at least a second service, a notification of the outage affecting the service, wherein the at least a second service is identified as having a dependency on the service associated with the first chat channel;

computer readable program code configured to determine, at the at least a second chat channel, the outage is causing an incident with the at least a second service, wherein the determining comprises monitoring the at least a second chat channel for messages related to the incident; and computer readable program code configured to interject, within the at least a second chat channel, a message regarding the outage affecting the service, responsive to determining the outage is causing the incident.

12. The computer program product of claim 11, wherein the dependency is identified, using a dependency knowledge builder, from historical chat communications across chat channels of the distributed collaboration environment, each of the chat channels being associated with a service.

13. The computer program product of claim 12, wherein the historical chat communications are filtered to identify the historical chat communications from a plurality of chat channels that are applicable to a specific outage type and wherein the dependency is identified based upon identifying services associated with each of the plurality of chat channels corresponding to the filtered historical chat communications.

14. The computer program product of claim 11, wherein the dependency is identified by applying dependency rules to communications on the plurality of chat channels and determining a chat channel is dependent on another chat channel when results of the dependency rules exceed a predetermined threshold number.

15. The computer program product of claim 14, further comprising feedback from a user regarding an accuracy of the identified dependency and utilizing the feedback to further tune the identification of dependencies.

16. The computer program product of claim 11, wherein the message comprises an indication of the outage as a possible cause of the incident.

17. The computer program product of claim 11, further comprising monitoring, from the at least a second chat channel, the first chat channel for communications related to resolution of the outage.

18. The computer program product of claim 17, further comprising interjecting, within the at least a second chat channel, a message regarding the resolution of the outage.

* * * * *